(12) United States Patent
Sandiford (10) Patent No.: US 10,772,288 B1
(45) Date of Patent: Sep. 15, 2020

(54) PET CARRIER CAR SEAT

(71) Applicant: Doskocil Manufacturing Company, Inc., Arlington, TX (US)

(72) Inventor: John Sandiford, East Earl, PA (US)

(73) Assignee: DOSKOCIL MANUFACTURING COMPANY, INC, Arlington, TX (US)

( * ) Notice: Subject to any disclaimer, the term of this patent is extended or adjusted under 35 U.S.C. 154(b) by 245 days.

(21) Appl. No.: 16/009,036

(22) Filed: Jun. 14, 2018

(51) Int. Cl.
*A01K 1/02* (2006.01)

(52) U.S. Cl.
CPC .......... *A01K 1/0272* (2013.01); *A01K 1/0254* (2013.01)

(58) Field of Classification Search
CPC .. A01K 1/0272; A01K 1/0254; B60R 22/105; B60R 22/14; B60N 2002/2815; B60N 2002/2818; B60N 2/2806
USPC ........................................................ 119/497
See application file for complete search history.

(56) References Cited

U.S. PATENT DOCUMENTS

| | | |
|---|---|---|
| 5,170,745 A | 12/1992 | Burdette |
| 5,671,698 A | 9/1997 | Farrugia |
| D398,083 S | 9/1998 | Martz |
| 5,941,195 A | 8/1999 | Martz |
| 6,286,461 B1 | 9/2001 | Martz |
| 7,210,426 B2 | 5/2007 | Yeung |
| D575,461 S | 8/2008 | Cannon |
| D649,719 S | 11/2011 | Siklosi et al. |
| 8,230,818 B2 | 7/2012 | Pietra |
| 8,584,618 B1 * | 11/2013 | Batson ................ A01K 1/0272 119/496 |
| 8,714,111 B2 | 5/2014 | Bryson |
| 9,226,473 B2 | 1/2016 | Hoffman |
| 9,392,766 B1 | 7/2016 | Elden |
| D804,738 S | 12/2017 | Nourollah |
| 9,849,838 B1 * | 12/2017 | Siciliano ................ B60R 11/00 |
| 2003/0127060 A1 * | 7/2003 | Yeung ................ A01K 1/0254 119/497 |
| 2006/0278173 A1 | 12/2006 | Kamijo |
| 2007/0102253 A1 * | 5/2007 | Godshaw ............. A45C 7/0036 190/18 A |
| 2007/0131568 A1 * | 6/2007 | Georgia ................. B60R 7/043 206/223 |

(Continued)

FOREIGN PATENT DOCUMENTS

| | | |
|---|---|---|
| EM | 001215248-0040 | 11/2012 |
| JP | 2004/217173 A | 8/2004 |

(Continued)

OTHER PUBLICATIONS

Petego; Petego ISOFIX-Latch Connection for Jet Set Carriers, webpage, unknown publication date.

(Continued)

*Primary Examiner* — Claude J Brown
(74) *Attorney, Agent, or Firm* — Global IP Counselors, LLP (57) ABSTRACT

An engagement structure for a pet seat including an anchor post secured to a front side of a pet seat, a pivot post, spaced apart from the anchor post, secured to the front side of the pet seat, and a rotatable arm rotatably secured to the pivot post at a first end of the rotatable arm, with an opposing second end of the rotatable arm removably engaged to the anchor post. The rotatable arm is pivotable about the pivot post to open and close the engagement structure.

18 Claims, 8 Drawing Sheets

(56) References Cited

U.S. PATENT DOCUMENTS

| | | | |
|---|---|---|---|
| 2007/0193522 A1 | 8/2007 | Greschler | |
| 2008/0156275 A1* | 7/2008 | Lam | A01K 1/0254 |
| | | | 119/497 |
| 2008/0216760 A1 | 9/2008 | Cannon et al. | |
| 2010/0000472 A1 | 1/2010 | Siklosi | |
| 2010/0139573 A1 | 6/2010 | Wilson et al. | |
| 2010/0288204 A1 | 11/2010 | Costello | |
| 2012/0186533 A1 | 7/2012 | Lu | |
| 2013/0213315 A1* | 8/2013 | Dorfman | A01K 1/00 |
| | | | 119/496 |
| 2016/0057968 A1 | 3/2016 | Chandler | |
| 2018/0359990 A1* | 12/2018 | Graham | A45F 3/02 |

FOREIGN PATENT DOCUMENTS

| | | |
|---|---|---|
| JP | D1434633 S | 2/2012 |
| JP | 2015/096167 A | 5/2015 |

OTHER PUBLICATIONS

Unknown Author; electronic photograph of Petego ISOFIX-Latch pet carrier; unknown publication date.

Gen 7, Inc.; Gen 7 Commuter™ Pet Carrier & Car Seat, webpage, on or about Sep. 2017.

Unknown Author; KritterWorld Soft Side Pet Carrier Travel Bag; webpage, unknown publication date.

Unknown Author; Dog Cat Comfort Travel Crate Tote; webpage; unknown publication date.

Unknown Author; Pet Gear Carseat/Carrier; webpage; unknown publication date.

Unknown Author; Sherpa Deluxe Pet Carriers; webpage; unknown publication date.

* cited by examiner

PET CARRIER CAR SEAT

FIELD OF THE INVENTION

The present invention relates generally to devices for caring for animals and pets, and more specifically to devices used to transport animals, for example, household pets.

BACKGROUND OF THE INVENTION

Devices used to transport and care for animals, such as household pets, are various and plentiful. There are a smaller number that can also be safely used to contain pets during transportation in vehicles such as motor vehicles, for example, cars, trucks, SUVs, etc. as others are not properly designed to be properly secured within the interior of the motor vehicles in the event of an vehicular accident, rapid deceleration or severe maneuvering to avoid an obstacle or an accident, for example. Many of those that are so designed are of a rigid construction that may not reduce physical trauma to an animal contained therewithin when the animal strikes a rigid surface. Others are comprised of softer or flexible material, which may flex and give way when the animal contacts a surface during any accident, etc., but are difficult and time consuming to install inside the vehicle.

Some conventional pet car carriers/seats require use of a vehicle's ISOFIX system installed in newer vehicles to secure the child seats to the body of the vehicle by ISOFIX anchorages at the back bottom of vehicle seats, while others use existing seat belts and others use attachments to head rests, etc. ISOFIX is an internationally standardized car seat fitting system and has been standard in most cars since 2006 and may also include a third anchorage point, either a top tether or support leg. From February 2013 new cars with the ISOFIX system include the top tether. However, securing a pet car carrier/seat to the vehicle can be cumbersome and inefficient.

It is an object of the present invention to provide an improved pet carrier car seat engagement structure that utilizes a vehicle's seat belt to secure the car seat.

Other objects may appear hereafter.

SUMMARY OF THE INVENTION

The present invention seeks to provide an improved engagement structure for a pet seat.

In one exemplary embodiment of the present invention, an engagement structure for a pet seat includes an anchor post secured to a front side of a pet seat, a pivot post, spaced apart from the anchor post, secured to the front side of the pet seat, and a rotatable arm rotatably secured to the pivot post at a first end of the rotatable arm, with an opposing second end of the rotatable arm removably engaged to the anchor post, whereby the rotatable arm is pivotable about the pivot post to open and close the engagement structure.

In another exemplary embodiment of the present invention a seat belt engagement structure for a pet seat includes an anchor post secured to a front side of a pet seat, a pivot post secured to the front side of the pet seat, and a rotatable arm rotatably secured to the pivot post at a first end of the rotatable arm, with an opposing second end of the rotatable arm removably engaged to the anchor post, whereby the rotatable arm is pivotable about the pivot post to open and close the seat belt engagement structure to retain a portion of a seat belt within the seat belt engagement structure.

In yet another exemplary embodiment of the present invention, a method of using a method of securing a pet seat within a vehicle, including the steps of opening at least one seat belt engagement structure by rotating an arm about a pivot post at one end of the outer arm, securing an end of a seat belt around the pet seat and into a seat belt buckle so that a horizontal portion of the seat belt lies across a front side of the pet seat and a portion of the seat belt is proximate the at least one seat belt engagement structure, placing the proximate portion of the seat belt within the seat belt engagement device, and rotating the arm of the seat belt engagement structure about the pivot post to engage a anchor post with a distal portion of the arm to retain the proximate portion of the seat belt within the at least one seat belt engagement device, whereby the pet seat is secured.

BRIEF DESCRIPTION OF THE DRAWINGS

The present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

The term "about" when referring to a numerical range or value is a convenience and is to be interpreted as plus or minus 10% of that value or range. For example "from about 100 to 1000" is to be interpreted as within the range of 90 to 1100 and "about 1000" is to be interpreted as from 900 to 1100.

As illustrated in the FIGS, and for example in FIGS. 1-9, in exemplary embodiments of the present invention, pet carrier car seat 10 includes front side 12, backside 14, left end 16, right end 18, top 15 and bottom 17 (left and right are determined from the perspective of facing front side 12 of pet carrier car seat 10). Pet carrier car seat 10 may include mesh-like screens/egress structures. Front side 12 may include centered large screen 26, backside 14 may include centered dual screens 28a, 28b, one over the other, and top 15 may include centered zippered window egress structure 20. A pet within pet carrier car seat 10 may be accessed through window egress structure 20 and, if small enough, may be placed in, and removed through, top zippered mesh opening/window egress structure 20. It is noted that for many pets, they may place their head through top zippered mesh opening/window egress structure 20 and more clearly view their surroundings, feel less confined and may be petted and/or comforted. A pet may be leased to an interior lease (not shown) to restrain the pet within pet carrier car seat 10.

Figure 11:
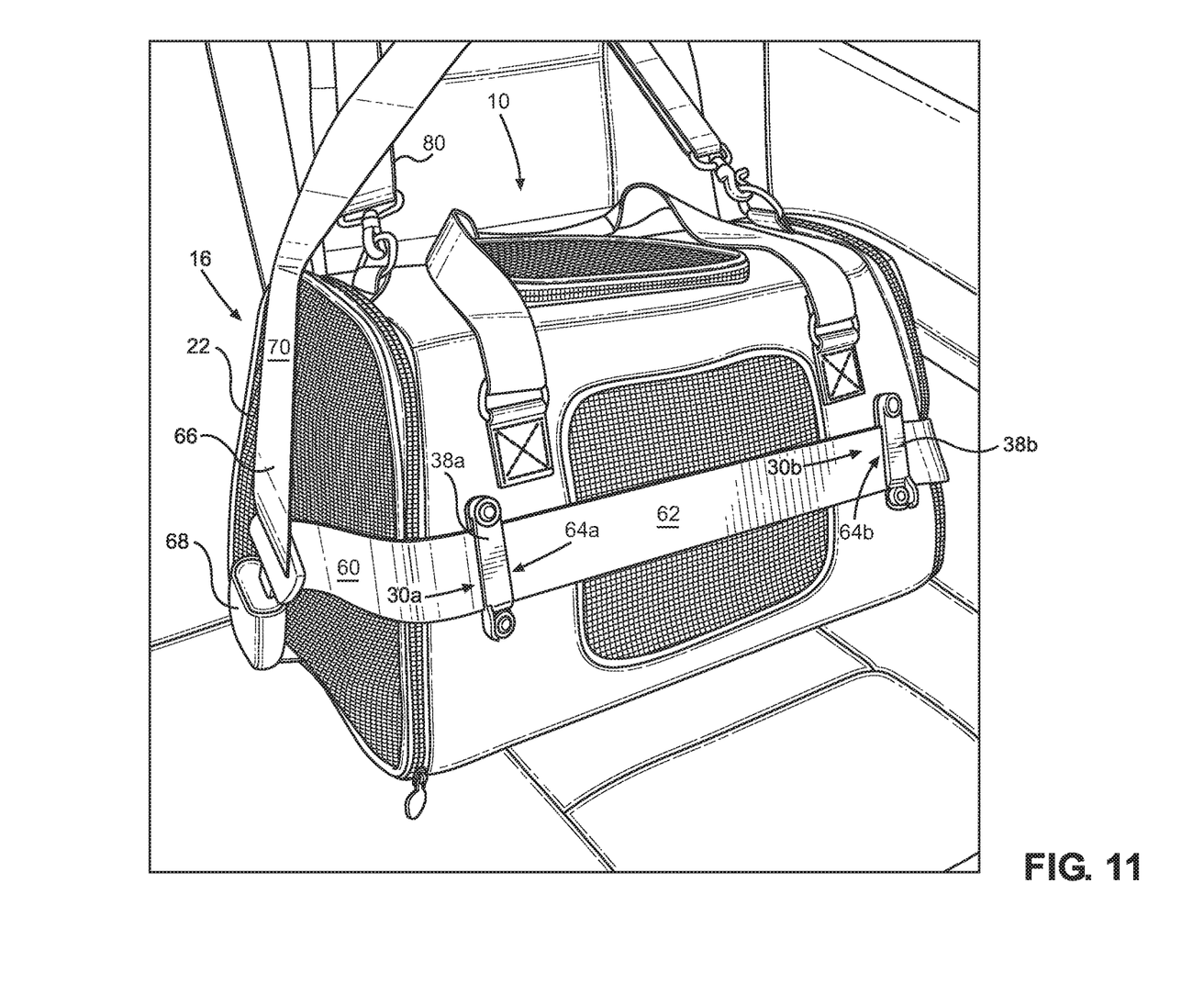
FIG. 11 is a perspective view from the left front side of a pet carrier car seat installed in the seat of a vehicle in accordance with another exemplary embodiment of the present invention.

Right end 18 may include right end zippered mesh opening/egress structure 24, and left end 16 may include left end zippered mesh opening/egress structure 22 (e.g., see FIG. 11). Left and right end zippered opening/egress structures 22, 24 may be sized to permit placement and removal of a pet from pet carrier car seat 10. Respective zippers may permit opening or closing of left and right end zippered opening/egress structures 22, 24. Carry-straps (tote handles) 50, 52 may be affixed to front side 12/backside 14 respectively and may be used to hold and carry pet carrier car seat 10 with or without a pet contained therein.

Affixed to front side 12 are spaced apart seat belt engagement structures 30a, 30b, adapted to receive seat belt 60, or the like, so as to secure pet carrier car seat 10 to a seat within a vehicle (e.g. see FIGS. 10-12 discussed below). Seat belt engagement structures 30a, 30b may include respective pivot posts 34a, 34b and anchor posts 32a, 32b to which inner arms 36a, 36b are affixed at their respective first ends 42a, 42b and opposing second ends 44a, 44b. Inner arms 36a, 36b may be sized and positioned to have a seat belt, or the like, overlie them between pivot posts 34a, 34b and anchor posts 32a, 32b. Outer rotatable arms 38a, 38b may be rotatably affixed at first ends 46a, 46b to respective pivot posts 34a, 34b so they may rotate about pivot posts 34a, 34b to expose inner arms 36a, 36b and facilitate placement, and removal, of a seat belt, or the like, over inner arms 36a, 36b. Opposing second ends 48a, 48b of outer rotatable arms 38a, 38b, may be adapted to reversibly engage respective anchor posts 32a, 32b. Outer rotatable arm opposing second ends 48a, 48b may include respective hook structures 40a, 40b, for example, which may be adapted to engage respective anchor posts 32a, 32b. Seat belt engagement structures 30a, 30b may be composed of a plastic, such as engineered nylon, or a metal. For weight considerations, seat belt engagement structures 30a, 30b may be composed of a plastic such an engineered nylon, or a light metal. The fabric of pet carrier car seat 10 may be composed of a strong nylon such as 1680D ballistic nylon—a very strong fabric. For example, the tensile strength (ISO 13934-1) of the 1680D ballistic nylon is about 2976N warp, and about 2743N weft, with an abrasion strength (ISO 12947-2) of greater than about 50,000 cycles endpoints (cycles). In an exemplary comparison, a 600D fabric has about a 868N warp, and about a 700N weft, with an abrasion strength (ISO 12947-2) of about 25,000 cycles endpoints (cycles). The 1680D ballistic nylon also has a shiny effect when viewed so it appears as a more high-end, and therefore desirable, product to potential consumers. Further, it is even knife resistant as it has a very high density and the yarn is very thick making pet carrier car seat 10 very durable and not easily damaged. Its knife resistance may also tend to resist being slashed, pierced or damaged by any other flying projectiles in the event of a vehicle accident/crash and/or rapid deceleration.

Figure 10:
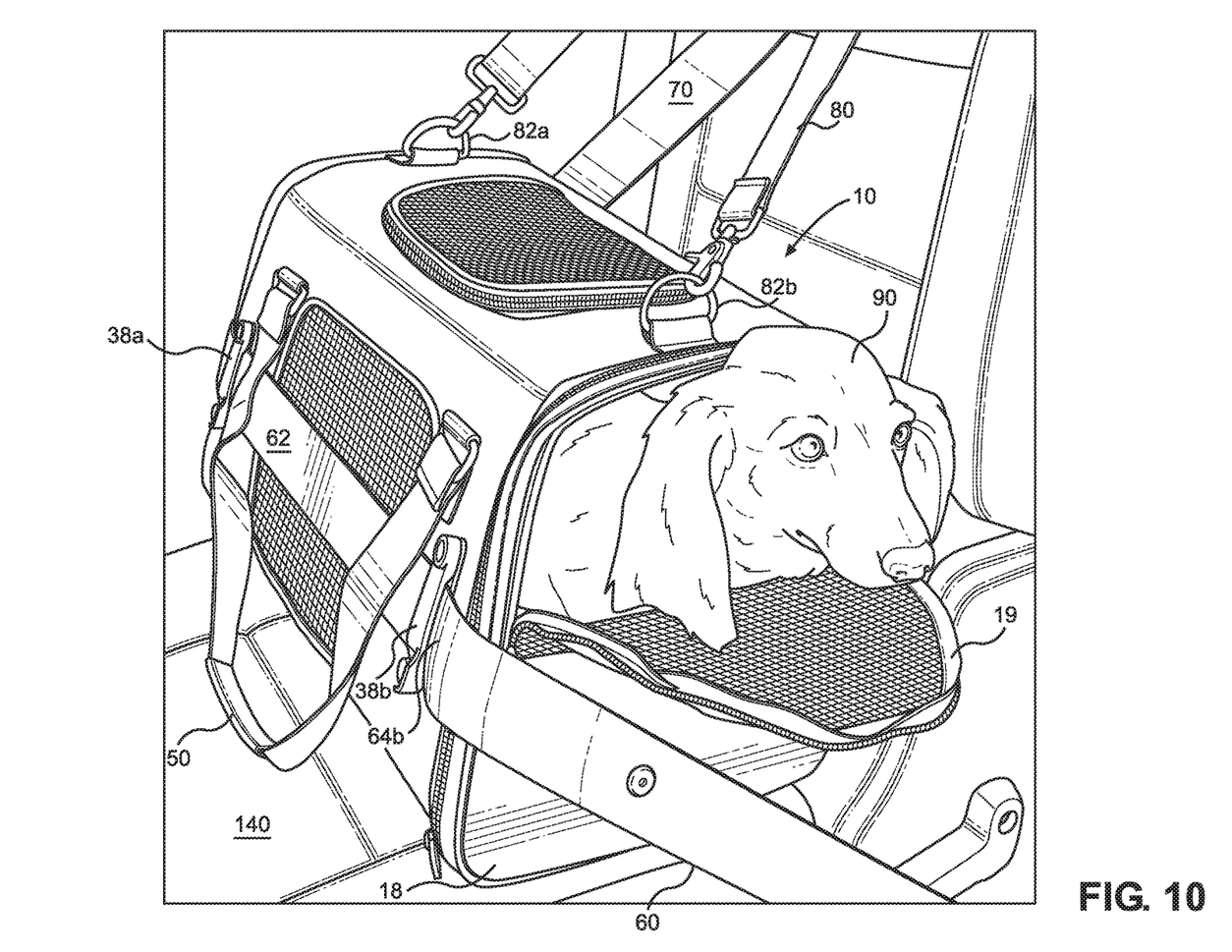
FIG. 10 is a perspective view from the right front side of a pet carrier car seat installed in the seat of a vehicle with a pet within the carrier/car seat in accordance with another exemplary embodiment of the present invention.
Figure 12:
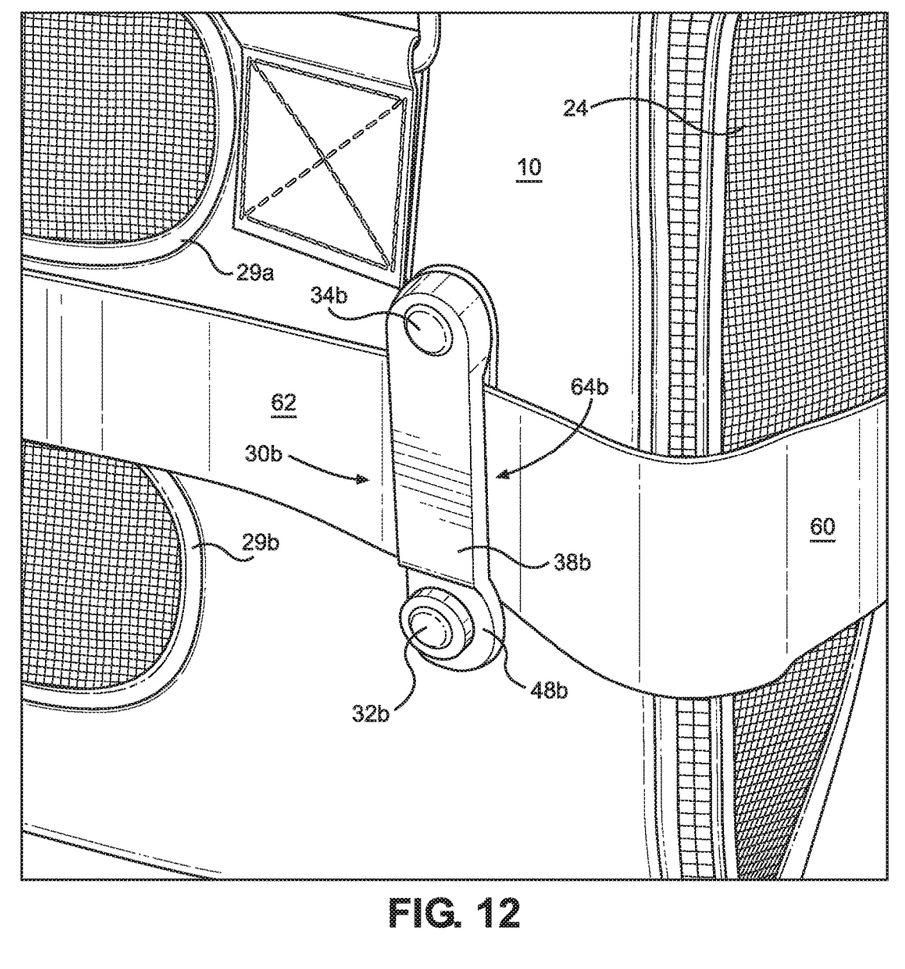
FIG. 12 is an enlarged perspective view of the right front side of a pet carrier car seat showing a seat belt positioned within one closed engagement structure in accordance with another exemplary embodiment of the present invention.

As illustrated in FIGS. 10-12 in another exemplary embodiment of the present invention, car seat 10, with pet 90 contained therewithin, may be placed in the left rear/driver side (in the United States, e.g.) seat of a vehicle or the like. It is noted in this alternate embodiment, the right end 18 includes zippered window 19 of about the top half of right end 18. As one of ordinary skill in the art would recognize, such a half-zippered window may be placed on left end 16 of car seat 10 with a zippered mesh opening/egress structure on right end 18 of car carrier/seat 10. This permits any pet 90 to place its head at least partially out of car seat 10. Outer rotatable arms 38a, 38b of seat belt engagement structures 30a, 30b may be rotated about pivot posts 34a, 34b so that hook structures 40a, 40b may disengage with respective anchor posts 34a, 34b. For example, outer rotatable arms 38a, 38b may at least partially expose inner arms 36a, 36b by being rotated: (a) just enough to (partially) expose inner arms 36a, 36b; (b) so that outer rotatable arms 38a, 38b are roughly parallel with bottom 17 of car seat 10; or (c) up to and beyond past being parallel to approaching being vertical and roughly perpendicular with bottom 17 of car seat 10 as an installer deems necessary, and most efficient. Seat belt 60 may then be drawn around car seat 10 so that lap/horizontal portion 62 at least roughly overlies inner arms 36a, 36b proximate seat belt portions 64a, 64b and end 66 of seat belt 60 engages with seat belt buckle 68 affixed to the vehicle. In either order, seat belt proximate portions 64a, 64b may be placed over (partially) exposed inner arms 36a, 36b, and outer rotatable arms 38a, 38b rotated so that hook structures 40a, 40b may engage with anchor posts 32a, 32b to retain and restrain seat belt 60 within seat belt engagement structures 30a, 30b, and thus retaining and restraining car seat 10 on the seat of the vehicle. Seat belt engagement structures 30a, 30b are durable and keep pet carrier car seat 10 in its proper position in vehicle seat 140 (e.g., see FIG. 10). Shoulder strap portion 70 of seat belt 60 may contact car seat 10 at left end 16 and partially over left end zippered mesh opening 22 and may assist in reducing/restraining car seat 10 from lateral movement. Further, right end 18 of car seat 10 is proximate the car door with a portion of horizontal/lap portion 62 at least proximate thereto and may assist in reducing/restraining car seat 10 from lateral movement. It is noted that FIG. 12 illustrates an alternate exemplary embodiment in which there is centered dual screens 29a, 29b, one over the other, on front side 12 of car seat 10, where lap/horizontal portion 62 of seat belt 60 may be between, or partially between, dual screens 29a, 29b. As one skilled in the art would understand, pet carrier car seat 10 may be placed in the right rear seat behind a front seat passenger (in the United States, e.g.), or in the center seat if there is a corresponding head rest for the center seat.

Car seat 10 may further include top centered strap 80 that may also be a shoulder strap for carrying car seat 10 with or without pet 90. Top strap 80 may be affixed at either end to pet seat 10 to, for example, D-rings 82a, 82b, and may be secured to a head rest (not shown) to further secure car seat 10 within the vehicle. Top strap 80 may include an adjustable portion to lengthen/shorten the overall length of top strap 80, and which may be adjusted to put a predetermined strain on top strap 80 once pet seat 10 is secured to vehicle seat 140 using seat belt 60. This would further limit lateral movement of car seat 10 and forward motion of car seat 10.

Figure 1:
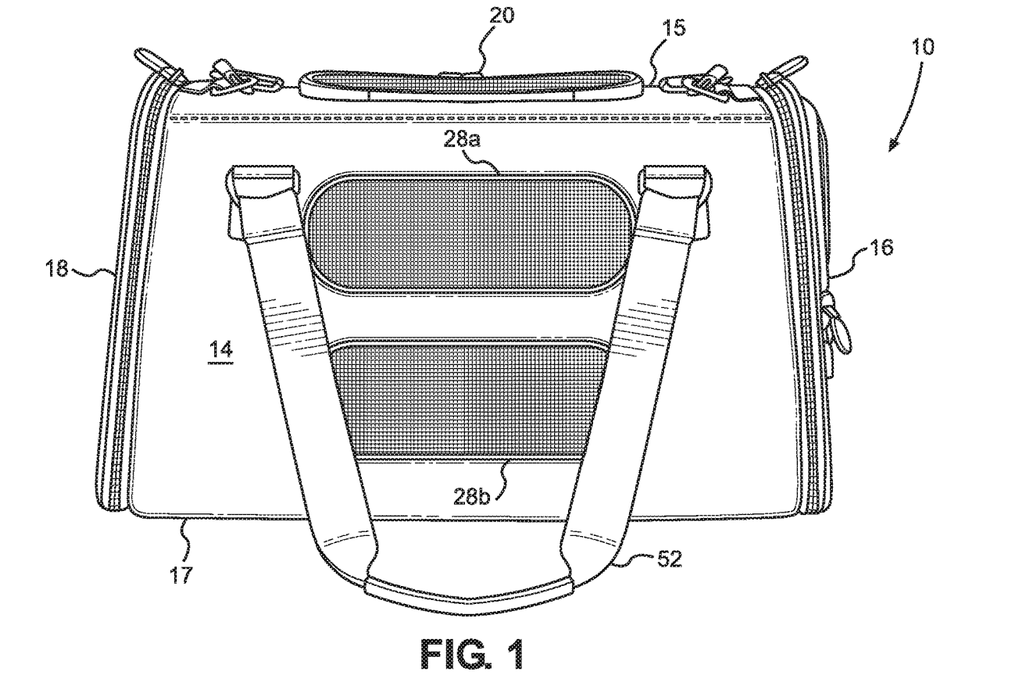
FIG. 1 is a plan view of the backside of a pet carrier car seat in accordance with an exemplary embodiment of the present invention.
Figure 2:
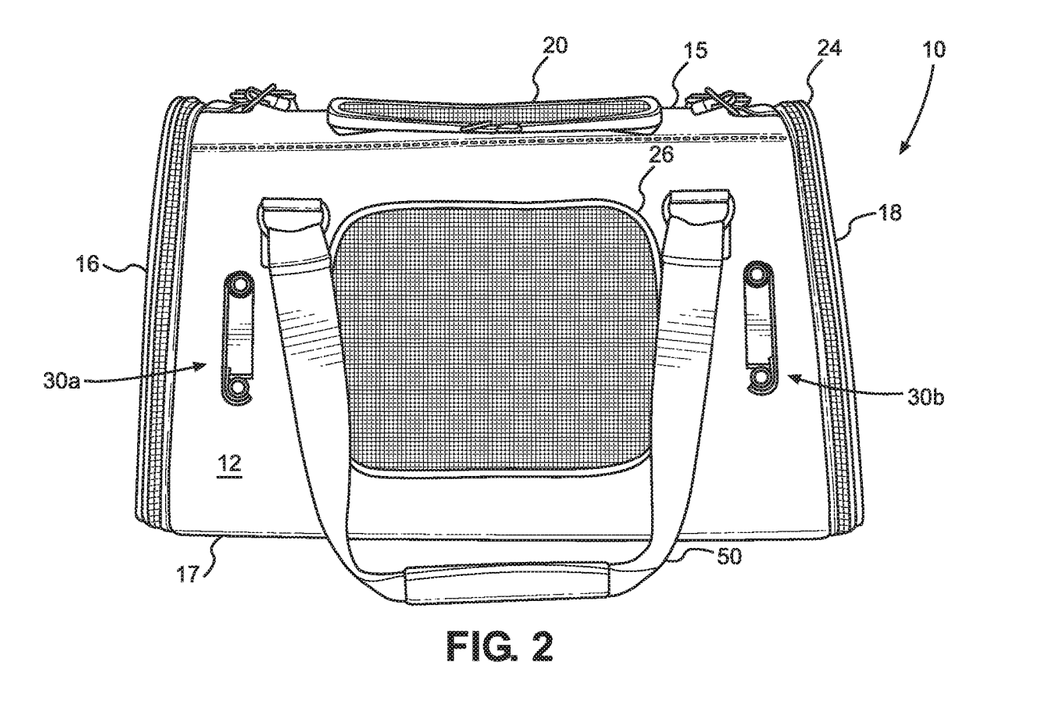
FIG. 2 is a plan view of the front side of a pet carrier car seat in accordance with an exemplary embodiment of the present invention.
Figure 3:
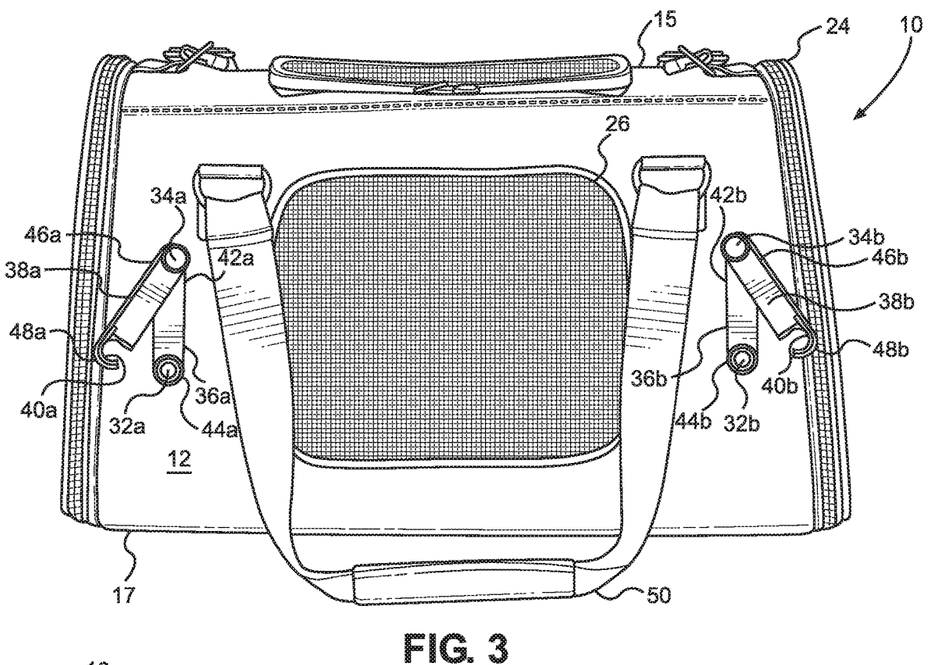
FIG. 3 is a plan view of the front side of a pet carrier car seat in accordance with an exemplary embodiment of the present invention.
Figure 4:
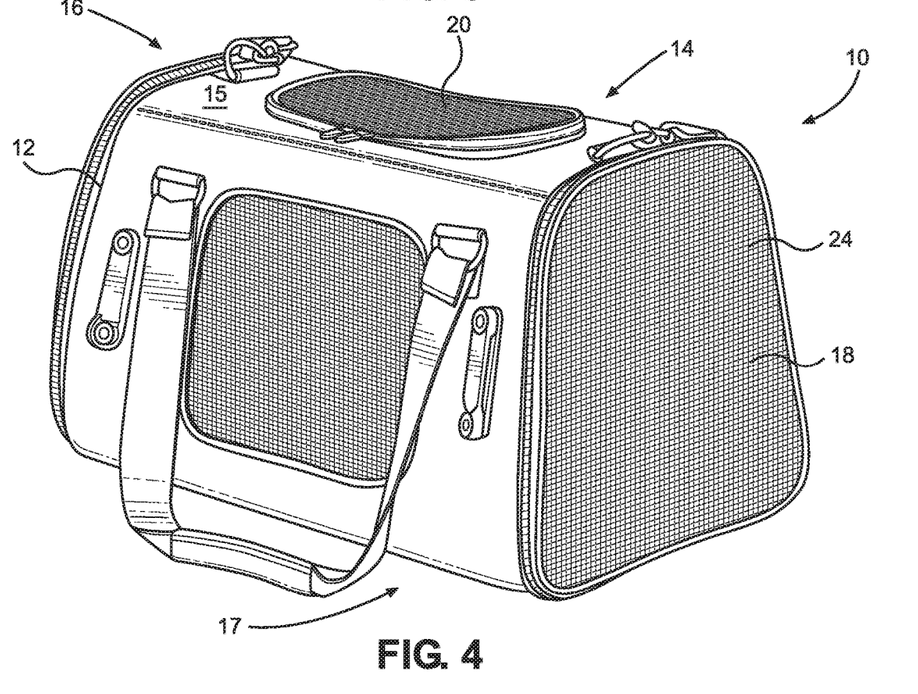
FIG. 4 is a perspective view of the right front side of a pet carrier car seat in accordance with an exemplary embodiment of the present invention.
Figure 5:
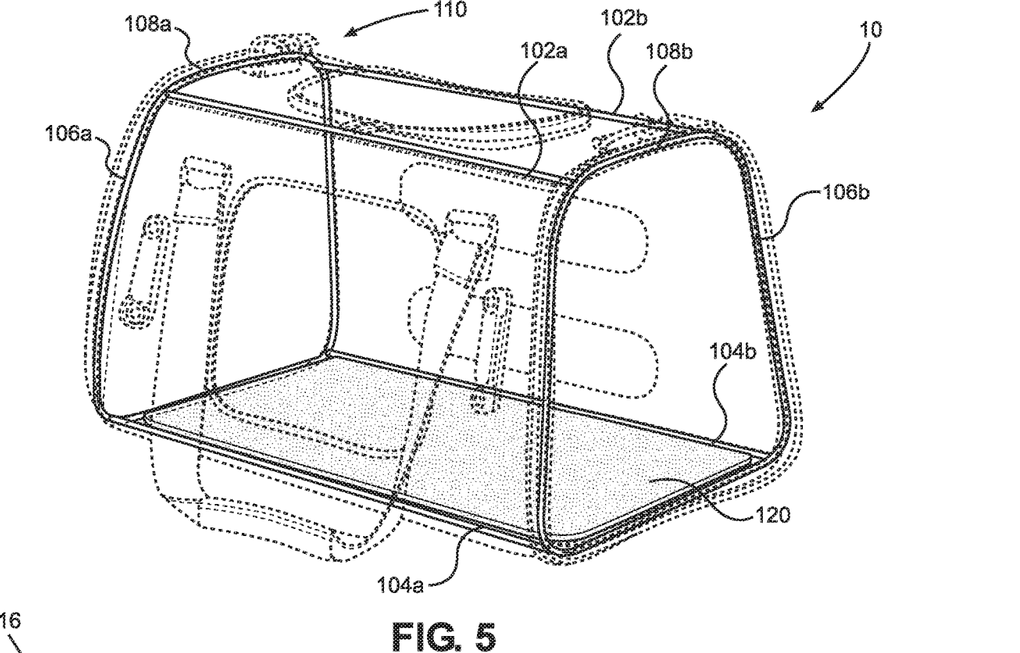
FIG. 5 is translucent perspective view of the pet carrier car seat of FIG. 4 showing the frame structure in accordance with another exemplary embodiment of the present invention.
Figure 6:
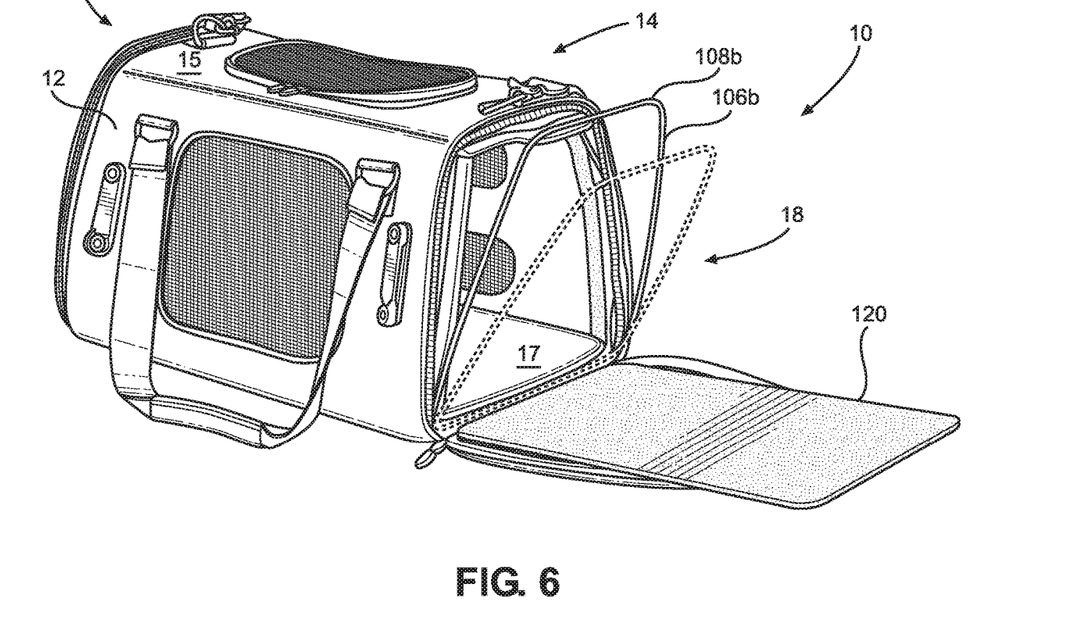
FIG. 6 is a perspective view of the front side of a pet carrier car seat of FIG. 4 showing the right zippered end opened with the right end wire frame being opened or closed in the right end in accordance with another exemplary embodiment of the present invention.
Figure 7:
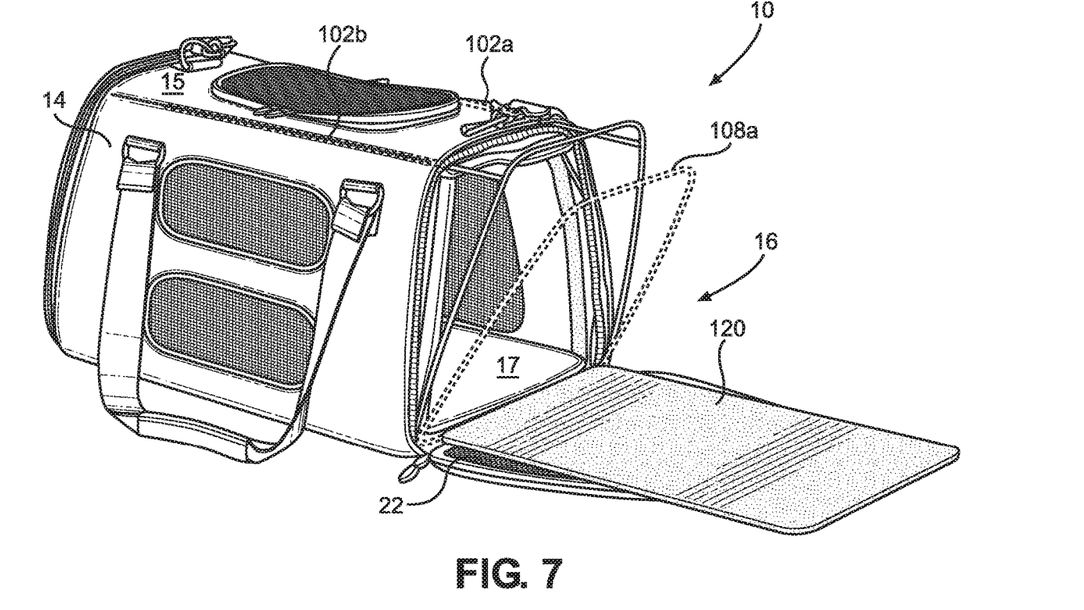
FIG. 7 is a perspective view of the backside of a pet carrier car seat of FIG. 4 showing the left (from the front side view) zippered end opened with the left end wire frame being opened or closed in the left end, and showing the transverse wire frame members partially extending out from the carrier/car seat in accordance with a further exemplary embodiment of the present invention.
Figure 8:
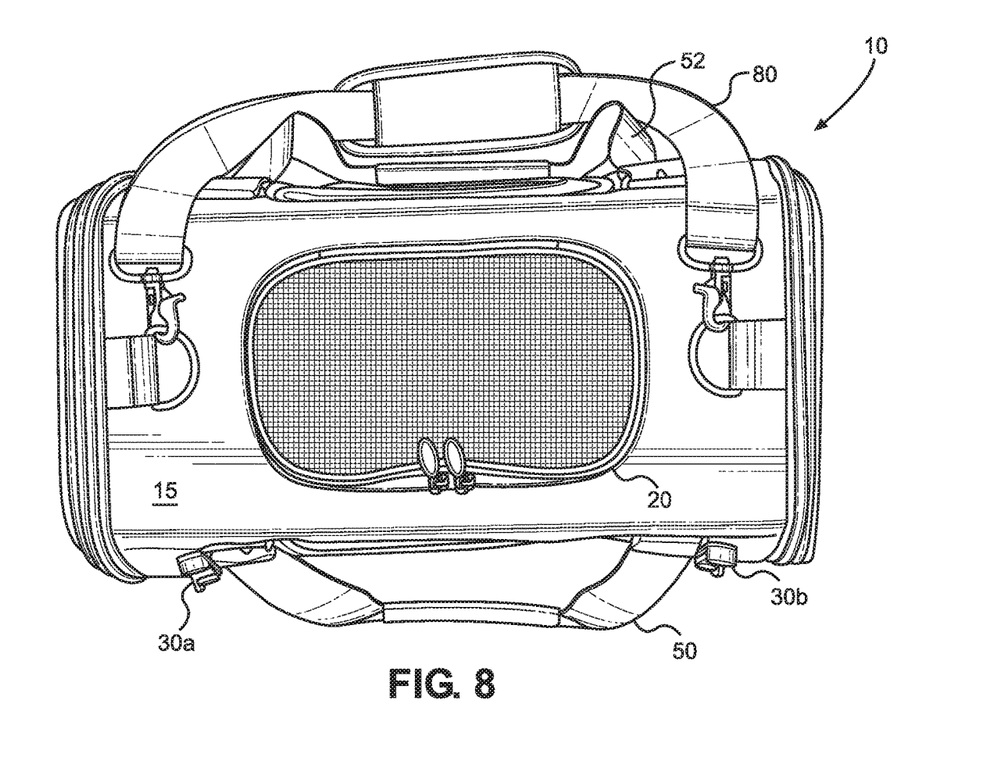
FIG. 8 is a plan top view of a pet carrier car seat in accordance with another exemplary embodiment of the present invention.
Figure 9:
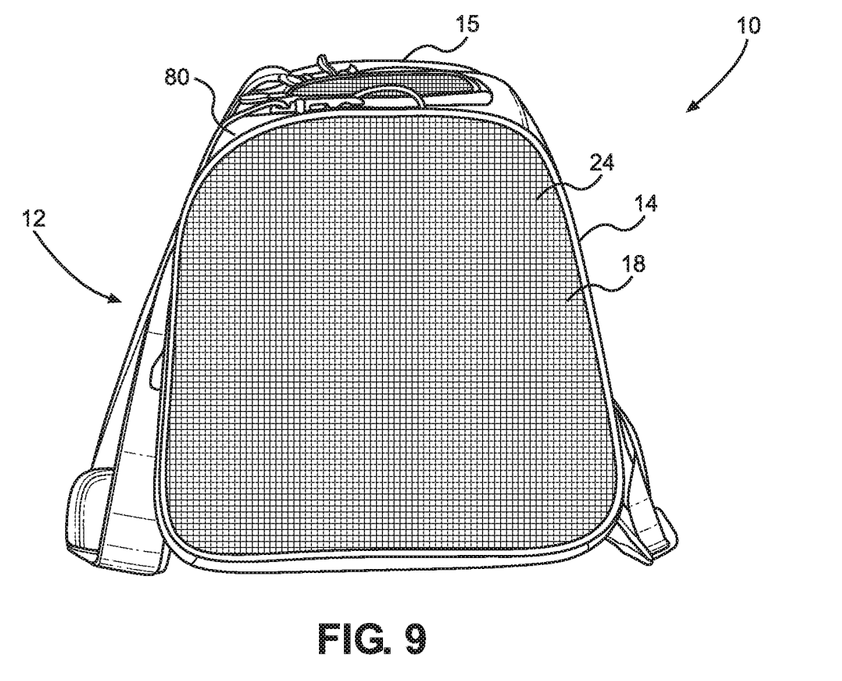
FIG. 9 is a perspective view of the right end a pet carrier car seat in accordance with another exemplary embodiment of the present invention.

As illustrated in FIGS. 5-7, in an exemplary embodiment of the present invention, car seat/carrier 10 may include at least a partial wire frame to maintain the structure of pet carrier car seat 10 during normal use as a pet carrier, and when strapped to a seat in a vehicle (with FIGS. 6-7 illustrating different positions of right-hinged wire end section 106b while being raised or lowered). Wire frame 110 may include upper longitudinal wire sections 102a, 102b, lower longitudinal wire sections 104a, 104b, and left- and right-hinged wire end sections 106a, 106b. Hinged wire end sections 106a, 106b pivot at their respective lower base and may fold down to permit collapse of pet carrier car seat 10 for storage. When pet carrier car seat 10 is raised, each left- and right-hinged wire end section 106a, 106b may be raised and held in place by, for example, hook and loop structures (not shown) overlying each upper horizontal wire portion 108a, 108b, to form the containment structure for a pet.

Pet carrier car seat 10 may include a lower, interior removable pad 120 that is easy to clean and is machine washable, and a short lease (not shown) affixed to the interior compartment to ensure a pet stays within the pet carrier car seat 10 regardless of which zippered mesh is opened.

During any accident, rapid deceleration or severe maneuvering to avoid an obstacle or an accident, for example, pet 90 secured within pet carrier car seat 10 may be cushioned from any trauma and, importantly, may be restrained within pet carrier car seat 10 so as not to become a missile for other occupants in the vehicle. Pet carrier car seat 10 has been crash tested and rated 5-stars (out of 5 stars) (rated to 20 pounds) (http://www.centerforpetsafety.org/cps-certified/gen7pets-gen7commuter-carrier/) by The Center for Pet Safety® (registered trademark of Center for Pet Safety, Reston, Va.) (http://wwwcenterforpetsafety.org). Pet carrier car seat 10 is also approved for use on most major airlines. Pet carrier car seat 10 may have overall dimensions of about 18" long by 11" high and 11" wide to be easily transferred in and out of vehicles (and aircraft), and may include heavy duty hardware with padded shoulder strap 80.

One skilled in the art would understand that the invention as described may be practiced with alternate structures/methods within the scope of the invention. For example, the FIGS. show the use of a partially zippered mesh opening at a right side or the left side. Either side may have a partially zippered mesh opening as long as one zippered opening is large enough to easily place a pet within the pet carrier car seat and remove a pet from the pet carrier car seat. Usually, one side would have a full zippered opening allowing the entire height of the side opening to be used to place a pet within, and remove a pet from, the pet carrier car seat.

While particular embodiments and implementations of the present invention have been illustrated and described, it is not intended to limit the invention, and obvious modifications and equivalent arrangements are contemplated that fall within the scope of the appended claims. The features of the invention expressed in the following claims may be arranged in any combination and in any order within the purview of the claims.

I claim:

1. An engagement structure for a pet seat comprising:
   an anchor post secured to a front side of a pet seat;
   a pivot post, spaced apart from the anchor post, secured to the front side of the pet seat; and
   a rotatable arm rotatably secured to the pivot post at a first end of the rotatable arm, with an opposing second end of the rotatable arm removably engaged to the anchor post, whereby the rotatable arm is pivotable about the pivot post to open and close the engagement structure.

2. An engagement structure of claim 1 further comprising:
   a hook formed in the opposing second end of the rotatable arm, the hook reversibly engaging the anchor post.

3. An engagement structure of claim 1 further comprising:
   a fixed arm underlying the rotatable arm, the fixed arm secured to the pivot post at a first end of the fixed arm, with an opposing second end of the fixed arm secured to the anchor post.

4. An engagement structure of claim 3 wherein the rotatable arm and fixed arm are each in a vertical position in operation.

5. An engagement structure of claim 1 wherein the engagement structure is adapted to receive a seat belt therein.

6. An engagement structure of claim 1 further comprising a second engagement structure positioned on the pet seat at a predetermined horizontal distance from the engagement structure.

7. A seat belt engagement structure for a pet seat comprising:
   an anchor post secured to a front side of a pet seat;
   a pivot post secured to the front side of the pet seat; and
   a rotatable arm rotatably secured to the pivot post at a first end of the rotatable arm, with an opposing second end of the rotatable arm removably engaged to the anchor post, whereby the rotatable arm is pivotable about the pivot post to open and close the seat belt engagement structure to retain a portion of a seat belt within the seat belt engagement structure.

8. A seat belt engagement structure of claim 7 further comprising:
   a hook formed in the opposing second end of the rotatable arm, the hook reversibly engaging the anchor post to retain the portion of the seat belt.

9. A seat belt engagement structure of claim 7 further comprising:
   a fixed arm underlying the rotatable arm, the fixed arm secured to the pivot post at a first end of the fixed arm, with an opposing second end of the fixed arm secured to the anchor post, whereby the fixed arm maintains a distance between the pivot post and the anchor post during engagement and disengagement of the portion of the seat belt.

10. A seat belt engagement structure of claim 9 wherein the rotatable arm and the fixed arm are each in a vertical position in operation.

11. A seat belt engagement structure of claim 7 further comprising a second engagement structure positioned on the pet seat at a predetermined horizontal distance from the engagement structure.

12. A seat belt engagement structure of claim 11 wherein the second engagement structure is adaptable to engage another portion of the seat belt.

13. A method of securing a pet seat within a vehicle, comprising the steps of:
- opening at least one seat belt engagement structure by rotating an arm about a pivot post at one end of the arm;
- securing an end of a seat belt around the pet seat and into a seat belt buckle so that a horizontal portion of the seat belt lies across a front side of the pet seat and a portion of the seat belt is proximate the at least one seat belt engagement structure;
- placing the proximate portion of the seat belt within the at least one seat belt engagement device; and
- rotating the arm of the at least one seat belt engagement structure about the pivot post to engage an anchor post with a distal portion of the arm to retain the proximate portion of the seat belt within the at least one seat belt engagement device, whereby the pet seat is secured.

14. A method of claim 13 further comprising:
engaging a hook at the distal portion of the arm with the anchor post when engaging the distal portion of the arm with the anchor post.

15. A method of claim 13 further comprising:
overlying a second fixed arm with the proximate portion of the seat belt when placing the proximate portion of the seat belt within the at least one seat belt engagement device.

16. A method of claim 13 further comprising:
retaining the seat belt within a second seat belt engagement structure spaced horizontally from the at least one seat belt engagement structure.

17. A method of claim 13 further comprising:
opening a frame structure with opposing frames at either end of the pet seat to maintain a relatively fixed containment area.

18. A method of claim 13 further comprising:
opening a second seat belt engagement structure, spaced apart from the at least one seat belt engagement structure, by rotating a second arm about a second pivot post at one end of the second arm.

* * * * *